(12) United States Patent
Caprioli et al.

(10) Patent No.: US 9,280,492 B2
(45) Date of Patent: Mar. 8, 2016

(54) SYSTEM AND METHOD FOR A LOAD INSTRUCTION WITH CODE CONVERSION HAVING ACCESS PERMISSIONS TO INDICATE FAILURE OF LOAD CONTENT FROM REGISTERS

(71) Applicant: Intel Corporation, Santa Clara, CA (US)

(72) Inventors: Paul Caprioli, Hillsboro, OR (US); Alexandre Farcy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 21 days.

(21) Appl. No.: 14/142,834

(22) Filed: Dec. 28, 2013

(65) Prior Publication Data

US 2015/0186299 A1    Jul. 2, 2015

(51) Int. Cl.
*G06F 3/00* (2006.01)
*G06F 12/14* (2006.01)
*G06F 9/30* (2006.01)

(52) U.S. Cl.
CPC ........ *G06F 12/1458* (2013.01); *G06F 9/30043* (2013.01)

(58) Field of Classification Search
USPC ................ 712/23, 242; 711/163, 207; 726/23
See application file for complete search history.

(56) References Cited

U.S. PATENT DOCUMENTS

| | | | |
|---|---|---|---|
| 6,336,178 B1 * | 1/2002 | Favor | 712/23 |
| 6,581,150 B1 | 6/2003 | Col et al. | |
| 7,805,588 B2 * | 9/2010 | Bridges et al. | 711/207 |
| 8,627,471 B2 * | 1/2014 | Moyer et al. | 726/23 |
| 2005/0251668 A1 * | 11/2005 | Chaudhry | G06F 9/383 |
| | | | 712/235 |

FOREIGN PATENT DOCUMENTS

| | | |
|---|---|---|
| EP | 1139222 A1 | 10/2001 |
| GB | 2482710 A | 2/2012 |

OTHER PUBLICATIONS

Extended European Search Report received for European Patent Application No. 14194406.6 mailed on May 6, 2015, 5 pages of European Search Report.

* cited by examiner

*Primary Examiner* — Tammara Peyton
(74) *Attorney, Agent, or Firm* — Thomas R. Lane

(57) ABSTRACT

Embodiments of an invention for a load instruction for code conversion are disclosed. In one embodiment, a processor includes an instruction unit and an execution unit. The instruction unit is to receive an instruction having a source operand to indicate a source location and a destination operand to indicate a destination location. The execution unit is to execute the instruction. Execution of the instruction includes checking the access permissions of the source location and loading content from the source location into the destination location if the access permissions of the source location indicate that the content is executable.

20 Claims, 4 Drawing Sheets

METHOD 400

METHOD 400

SYSTEM AND METHOD FOR A LOAD INSTRUCTION WITH CODE CONVERSION HAVING ACCESS PERMISSIONS TO INDICATE FAILURE OF LOAD CONTENT FROM REGISTERS

BACKGROUND

1. Field

The present disclosure pertains to the field of information processing, and more particularly, to the field of security in information processing systems.

2. Description of Related Art

Confidential information is stored, transmitted, and used by many information processing systems. Therefore, techniques have been developed to provide for the secure handling and storing of confidential information in information processing systems. For example, the contents of a system memory may be protected by access permissions such as read, write, and execute.

Furthermore, techniques have been developed for information processing systems to convert instructions from one instruction type or format to another. For example, one of two processors with different instruction set architectures may be able to run code written for or otherwise emulate the other processor through binary translation or other code conversion techniques.

BRIEF DESCRIPTION OF THE FIGURES

The present invention is illustrated by way of example and not limitation in the accompanying figures.

DETAILED DESCRIPTION

Figure 1:
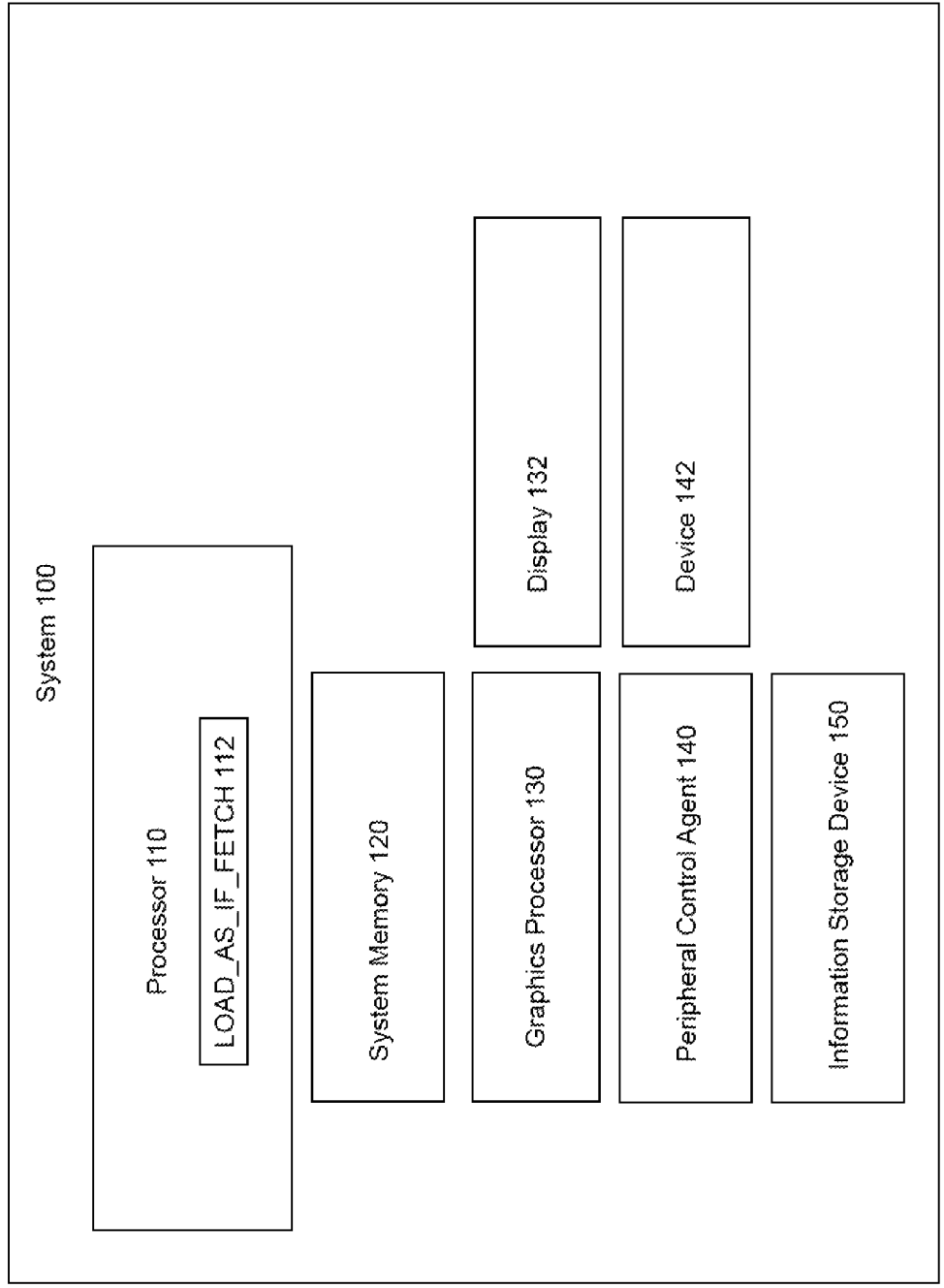
FIG. 1 illustrates a system including a processor to execute a load instruction for code conversion according to an embodiment the present invention.

Embodiments of an invention for a load instruction for code conversion are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment." "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in the claims, unless otherwise specified the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type of storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

As described in the background section, a first processor having a first instruction set architecture may be used to execute code written for a second processor having a second instruction set architecture that is different from the first instruction set architecture. Such code may be stored in the system memory of a system including the first processor, loaded into one or more storage locations within the processor, and converted to instructions in the instruction set architecture the processor. However, such a technique may not conform to the memory access permissions model of the system, since the code is intended to be executed but is not executable by the processor as stored in memory. Therefore, embodiments of the present invention provide for the use of a processor instruction which may be used to load code to be converted by the processor prior to execution.

FIG. 1 illustrates system 100, an information processing system including a processor to execute a load instruction for code conversion according to an embodiment of the present invention. System 100 may represent any type of information processing system, such as a server, a desktop computer, a portable computer, a set-top box, a hand-held device such as a tablet or a smart phone, or an embedded control system. System 100 includes processor 110, system memory 120, graphics processor 130, peripheral control agent 140, and information storage device 150. Systems embodying the present invention may include any number of each of these components and any other components or other elements, such as peripherals and input/output devices. Any or all of the components or other elements in this or any system embodiment, may be connected, coupled, or otherwise in communication with each other through any number of buses, point-to-point, or other wired or wireless interfaces or connections, unless specified otherwise. Any components or other portions of system 100, whether shown in FIG. 1 or not shown in FIG. 1, may be integrated or otherwise included on or in a single chip (a system-on-a-chip or SOC), die, substrate, or package.

System memory 120 may be dynamic random access memory or any other type of medium readable by processor 110. Graphics processor 130 may include any processor or other component for processing graphics data for display 132. Peripheral control agent 140 may represent any component, such as a chipset component, including or through which peripheral, input/output (I/O), or other components or devices, such as device 142 (e.g., a touchscreen, keyboard, microphone, speaker, other audio device, camera, video or other media device, network adapter, motion or other sensor, receiver for global positioning or other information, etc.)

and/or information storage device 150, may be connected or coupled to processor 110. Information storage device 150 may include any type of persistent or non-volatile memory or storage, such as a flash memory and/or a solid state, magnetic, or optical disk drive.

Processor 110 may represent one or more processors integrated on a single substrate or packaged within a single package, each of which may include multiple threads and/or multiple execution cores, in any combination. Each processor represented as or in processor 110 may be any type of processor, including a general purpose microprocessor, a special purpose processor, or a microcontroller. Processor 110 may be architected and designed to execute instructions of a first or native instruction set architecture. Instructions of the first or native instruction set architecture may be referred to as native instructions; instructions of a different instruction set architecture may be referred to as non-native instructions.

Although embodiments of the present invention may be practiced with a processor having any instruction set architecture, the load instruction may be a new instruction added to an existing instruction set architecture and may be referred to herein as a LOAD_AS_IF_FETCH instruction. Support for this instruction may be implemented in a processor using any combination of circuitry and/or logic embedded in hardware, microcode, firmware, and/or other structures arranged as described below or according to any other approach, and is represented in FIG. 1 as LOAD_AS_IF_FETCH logic 112.

Figure 2:
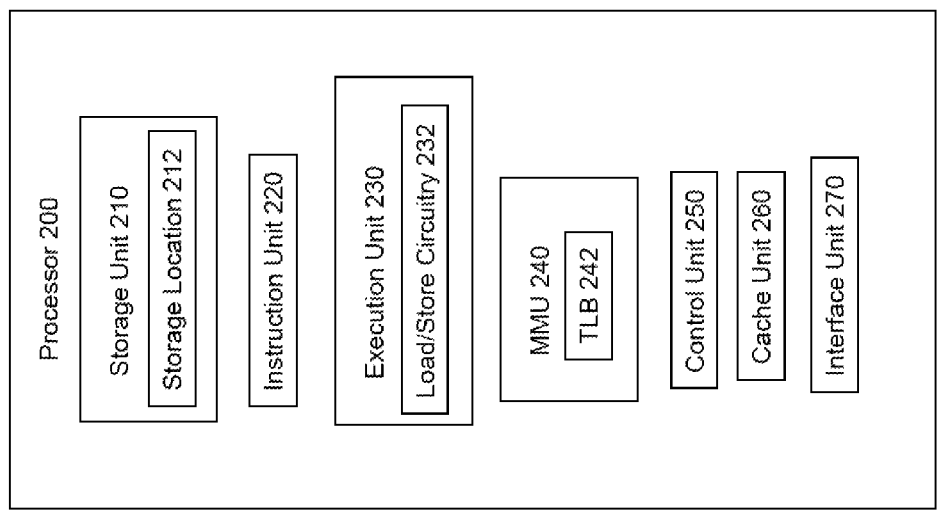
FIG. 2 illustrates a processor to execute a load instruction for code conversion according to an embodiment of the present invention.

FIG. 2 illustrates processor 200, an embodiment of which may serve as processor 110 in system 100. Processor 200 may include storage unit 210, instruction unit 220, execution unit 230, memory management unit 240, control unit 250, cache unit 260, and interface unit 270. Processor 200 may also include any other circuitry, structures, or logic not shown in FIG. 2. The functionality of LOAD_AS_IF_FETCH logic 112, as introduced above and further described below, may be contained in or distributed among any of the labeled units or elsewhere in processor 200.

Storage unit 210 may include any combination of any type of storage usable for any purpose within processor 200; for example, it may include ally number of readable, writable, and/or read-writable registers, buffers, and/or caches, implemented using any memory or storage technology, for storing capability information, configuration information, control information, status information, performance information, instructions, data, and any other information usable in the operation of processor 200, as well as circuitry usable to access such storage. Storage unit 210 may include one or more registers or other storage locations 212 that may be used as a destination of a LOAD_AS_IF_FETCH instruction, as further described below.

Instruction unit 220 may include any circuitry, logic, structures, and/or other hardware for fetching, receiving, decoding, interpreting, and/or scheduling instructions, such as LOAD_AS_IF_FETCH instructions, to be executed by processor 200. Any instruction format may be used within the scope of the present invention; for example, an instruction may include an opcode and one or more operands, where the opcode may be decoded into one or more micro-instructions or micro-operations for execution by execution unit 230. Instructions, such as those referred to above, may be leaves of a single opcode, where the leaf instructions are specified by the value in a processor register. Operands or other parameters may be associated with an instruction implicitly, directly, indirectly, or according to any other approach.

Execution unit 230 may include any circuitry, logic, structures, and/or other hardware, such as arithmetic units, logic units, floating point units, shifters, etc., for processing data and executing instructions, such as LOAD_AS_IF_FETCH instructions, micro-instructions, and/or micro-operations. Execution unit 230 may include load/store circuitry 232 to move data, instructions, and/or other information between one or more storage locations in storage unit 210, such as register 212, and system memory 120.

MMU 240 may include any circuitry, logic, structures, and/or other hardware to manage the memory space of processor 200. Memory management logic supports the use of virtual memory to provide software with an address space for storing and accessing code and data that is larger than the address space of the physical memory in the system, e.g., system memory 120. The virtual memory space of processor 200 may be limited only by the number of address bits available to software running on the processor, while the physical memory space of processor 200 is further limited to the size of system memory 120. MMU 240 supports a memory management scheme, such as paging, to swap the executing software's code and data in and out of system memory 120 on an as-needed basis. As part of this scheme, the software may access the virtual memory space of the processor with an un-translated address that is translated by the processor to a translated address that the processor may use to access the physical memory space of the processor.

Accordingly, MMU 240 may include translation lookaside buffer (TLB) 242 to store translations of a virtual, logical, linear, or other un-translated address to a physical or other translated address, according to any known memory management technique, such as paging. To perform these address translations. MMU 240 may refer to one or more data structures stored in processor 200, system memory 120, any other storage location in system 100 not shown in FIG. 1, and/or any combination of these locations. The data structures may include page directories and page tables according to the architecture of any processor or processor family.

Control unit 250 may include any microcode, firmware, circuitry, logic, structures, and/or other hardware to control the operation of the units and other elements of processor 200 and the transfer of data within, into, and out of processor 200. Control unit 250 may cause processor 200 to perform or participate in the performance of method embodiments of the present invention, such as method 300 described below, for example, by causing processor 200 to execute instructions, such as LOAD_AS_IF_FETCH instructions, received by instruction unit 210 and micro-instructions or micro-operations derived from instructions received by instruction unit 210.

Cache unit 260 may include any number of cache arrays and cache controllers in one or more levels of cache memory in a memory hierarchy of information processing system 100, implemented in static random access memory or any other memory technology. Cache unit 260 may be shared among any number of cores and/or logical processors within processor 200 according to any approach to caching in information processing systems. Cache unit 260 may be included in an uncore in an embodiment in which processor 200 represents a multicore processor or a single core of a multicore processor.

Interface unit 270 may represent any circuitry, logic, structures, and/or other hardware, such as a link unit, a bus unit, or a messaging unit to allow processor 200 to communicate with other components in a system such as system 100 through any type of bus, point to point, or other connection, directly or through any other component, such as a bridge, hub, or chipset. Interface unit 270 may include one or more integrated memory controllers to communicate with a system memory such as system memory 120 or may communicate with a system memory through one or more memory controllers external to processor 200.

Figure 3:
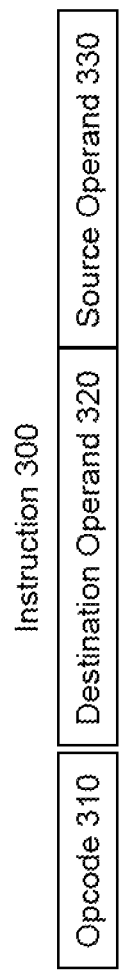
FIG. 3 illustrates a load instruction format according to an embodiment of the present invention.

FIG. 3 illustrates the format 300 of a load instruction for code conversion according to an embodiment of the present invention. Instruction format 300 includes opcode 310, first operand 320, and second operand 330, where each may be used to refer to a field of the instruction and/or the content of the field. Opcode 310 may represent a field for an opcode to identify the instruction, e.g., to instruction unit 220, as a load instruction for code conversion, e.g., a LOAD_AS_IF_FETCH instruction. Instruction unit 220 may decode or otherwise convert opcode 310 into one or more micro-instructions or micro-operations.

First or destination operand 320 may represent a first or destination field for a first or destination operand to identify a destination, e.g., storage location 212, for the instruction. For example, destination operand 320 may be the name of a register. In an embodiment the present invention, processor 200 may include one or more registers or other storage locations into which code is to be loaded for conversion; therefore, destination operand 320 may be used only to refer to one or more of these registers.

Second or source operand 330 may represent a second or source field for a second or source operand to identify a source, e.g., a location system memory 120, for the instruction. For example, source operand 330 may be the address of a memory location.

The execution of instruction 300 may cause the contents of the memory location indicated by source operand 330 to be loaded, copied, moved, or stored into the storage location indicated by destination operand 320, for example, by load/store circuitry 232 and interface unit 270.

Identification or other determination of the address or other identifier of the memory location indicated by source operand 330 may include translation of a first address to a second address, e.g., by MMU 240. This translation may include the checking of access permissions in a page directory, page table, or other data structure through which a page of other region of memory including the memory location is accessed. For example, a page table entry may include bits to indicate attributes of the page pointed or otherwise referred to by the entry, such as one or more bits to indicate whether the page includes data (and therefore its contents are readable) or instructions (and therefore its contents are executable).

In one embodiment, processor 200 may have an instruction set including a LOAD and a LOAD_AS_IF_FETCH instruction. In response to the LOAD instruction, the processor may attempt to load the contents of a memory location into a processor register, for example, a processor register used to hold data (a data register). Execution of the LOAD instruction may succeed and result in the processor loading the contents of the memory location into the data register if the access permissions associated with the memory location indicate that the contents are readable however, the execution or attempted execution of the LOAD instruction may fail and/or result in the processor raising an exception, page fault, or otherwise indicating a fault or error condition if the access permissions indicate that the contents are not readable and/or if the access permission indicate that the contents are executable.

Processor 200 may also fetch instructions from system memory 120 according to any known instruction fetch technique, such as through the advancement of an instruction pointer or through the use of a branch, jump, call, or other control transfer instruction. In response to an instruction fetch, the processor may attempt to load the contents of a memory location into a processor register, for example, a register used to hold instructions (an instruction register). The instruction fetch may succeed and result in the processor loading the contents of the memory location into the instruction register if the access permissions associated with the memory location indicate that the contents are executable; however, the execution or attempted instruction fetch may fail and/or result in the processor raising an exception, page fault, or otherwise indicating a fault or error condition if the access permissions indicate that the contents are readable and/or not executable.

Processor 200 may also, in response to the LOAD_AS_IF_FETCH instruction, attempt to load the contents of a memory location (the bytes) into a processor register, for example, a register used to hold instructions of a non-native instruction set architecture to be converted to instructions of the native instruction set architecture. Execution of the LOAD_AS_IF_FETCH instruction may succeed and result in the processor loading the bytes into the processor register if the access permissions associated with the memory location indicate that the contents are executable; however, the execution or attempted execution of the LOAD_AS_IF_FETCH instruction may fail and/or result in the processor raising an exception, page fault, or otherwise indicating a fault or error condition if the access permissions indicate that the contents are readable and/or not executable.

Various implementations of a LOAD_AS_IF_FETCH instruction are possible within various embodiments of the present invention. In an embodiment, processor hardware applies the same checks and restrictions to a LOAD_AS_IF_FETCH instruction as it does to an instruction fetch, instead of the checks and restrictions that it applies to a LOAD instruction.

In an embodiment, a LOAD_AS_IF_FETCH instruction succeeds if the page containing the location indicated by source address (the referenced page) is marked as executable, regardless of whether it is marked as readable. In an embodiment, a LOAD_AS_IF_FETCH instruction results in an exception if the referenced page is not marked as executable, regardless of whether it is marked as readable.

In an embodiment, a LOAD_AS_IF_FETCH instruction succeeds if the page containing the location indicated by source address (the referenced page) is marked as executable, regardless of the privilege level of the process, thread, of task invoking the LOAD_AS_IF_FETCH instruction. In an embodiment, a LOAD_AS_IF_FETCH instruction results in an exception if the referenced page is not marked as executable, regardless of the privilege level of the process, thread or task invoking the LOAD_AS_IF_FETCH instruction.

In an embodiment, processor 200 may support a processor mode or privilege level for code conversion in which a LOAD_AS_IF_FETCH instruction succeeds, and a LOAD_AS_IF_FETCH instruction results in an exception if the processor is operating in a mode other than the code conversion mode or privilege level.

In an embodiment, processor 200 may include breakpoint registers for debug or other purposes, and execution of a LOAD_AS_IF_FETCH instruction may include checking the breakpoint registers and loading the bytes if the source location is within the range defined by one or more breakpoint register(s).

In an embodiment, processor 200 may include hardware support for tracking code conversion to detect whether the original code has been changed by self-modifying code (SMC) or cross-modifying code. In this embodiment, execution of a LOAD_AS_IF_FETCH instruction may include indicating to the SMC detection hardware that the range of addresses read using the instruction are to be tracked. For example, a snoop filter in or applied by cache unit 260 that is responsible for cache coherency in system 100 may be configured to pass relevant snoops to a core that executes a LOAD_AS_IF_FETCH instruction.

A LOAD_AS_IF_FETCH instruction according to various embodiments of the present invention may be used to load code or instructions to be converted or translated for any reason, including instruction set architecture compatibility, performance improvement or optimization, and security (e.g., protection against return-oriented programming attacks).

Figure 4:
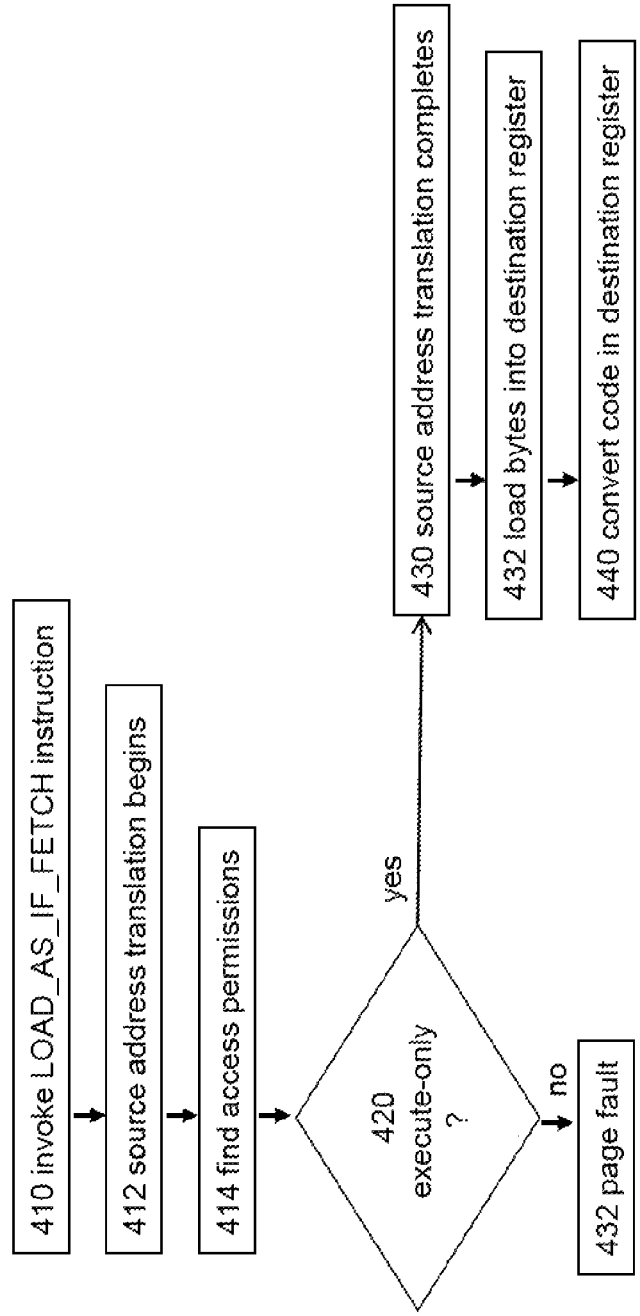
FIG. 4 illustrates a method including, the execution of a load instruction for code conversion according to an embodiment of the present invention.

FIG. 4 illustrates method 400 including executing a load instruction for code conversion. Although method embodiments of the invention are not limited in this respect, reference may be made to elements of FIGS. 1, 2, and 3 to help describe the method embodiment of FIG. 4. Also, method 400 may be described and illustrated, for convenience, using specific instruction names such as LOAD_AS_IF_FETCH; however, embodiments of the present invention are not limited to these specifically named instructions.

In box 410 of method 400, a process, thread, or task miming on processor 200 invokes a LOAD_AS_IF_FETCH instruction with storage location 212 as the destination operand and and a virtual memory address as the source operand. In box 412, translation of the virtual memory address to a physical memory address in system memory 120 begins. In box 414, the access permissions for a page including the physical memory address are found in a page table entry for the page.

In box 420, the access permissions are checked. If the access permissions indicate that the page is execute-only, method 400 continues in box 430. Otherwise, method 400 continues in box 422. In box 422, a page fault or other access violation exception occurs and the bytes from the physical memory address are not loaded into storage location 212.

In box 430, the translation of the virtual memory address to the physical memory address is successfully completed. In box 432, the bytes from the physical memory address are loaded into storage location 412.

In box 440, the process, thread, or task invokes one or more instructions to convert the content of storage location 212 from non-native code to native code.

In various embodiments of the present invention, the method illustrated in FIG. 3 may be performed in a different order, with illustrated boxes combined or omitted, with additional boxes added, or with a combination of reordered, combined, omitted, or additional boxes. Furthermore, method embodiments of the present invention are not limited to method 400 or variations thereof. Many other method embodiments (as well as apparatus, system, and other embodiments) not described herein are possible within the scope of the present invention.

Embodiments or portions of embodiments of the present invention, as described above, may be stored on any form of a machine-readable medium. For example, all or part of method 400 may be embodied in software or firmware instructions that are stored on a medium readable by processor 110, which when executed by processor 110, cause processor 110 to execute an embodiment of the present invention. Also, aspects of the present invention may be embodied in data stored on a machine-readable medium, where the data represents a design other information usable to fabricate all or part of processor 110.

Thus, embodiments of an invention for a load instruction for code conversion have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
   an instruction unit to receive a first instruction, wherein the first instruction is to have a source operand to indicate a source location and a destination operand to indicate a destination location; and
   an execution unit to execute the first instruction, wherein execution of the first instruction includes checking, by the processor, the access permissions of the source location and loading content from the source location into the destination location, wherein execution of the first instruction succeeds in loading content from the source location into the destination register if the access permissions of the source location indicate that the content is executable and execution of the first instruction fails to load content from the source location into the destination register if the access permissions indicate that the content is not executable.

2. The processor of claim 1, further comprising a plurality of data registers including the destination location.

3. The processor of claim 1, further comprising an interface unit to communicate with a system memory including the source location.

4. The processor of claim 1, further comprising a memory management unit to translate the source operand to a physical address in a system memory.

5. The processor of claim 4, wherein the memory management unit is to check the access permissions in connection with translating the source operand to the physical address in the system memory.

6. The processor of claim 1, wherein execution of the first instruction is also to include raising an exception if the access permissions of the source location indicate that the content is not executable.

7. The processor of claim 1, wherein the execution unit is also to execute instructions of a first instruction set architecture, including one or more second instructions to convert the content loaded into the destination location from a second instruction set architecture to the first instruction set architecture.

8. A method comprising:
   issuing, to a processor, a first instruction having a source operand to indicate a source location and a destination operand to indicate a destination location;
   executing, by the processor, the first instruction, wherein execution of the first instruction includes:
     checking, by the processor, the access permissions of the source location;
     loading content from the source location into the destination location if the access permissions of the source location indicate that the content is executable; and
     failing to load content from the source location into the destination register if the access permissions indicate that the content is not executable.

9. The method of claim 8, wherein the destination location is a data register in the processor.

10. The method of claim 8, wherein the source location is a memory location in a system memory.

11. The method of claim 8, further comprising translating the source operand to a physical address in a system memory.

12. The method of claim 11, wherein the translating the source operand includes checking the access permissions.

13. The method of claim 8, further comprising raising an exception if the access permissions of the source location indicate that the content is not executable.

14. The method of claim 8, further comprising converting the content loaded into the destination register to a first instruction set architecture from a second instruction set architecture, wherein the first instruction set architecture is the instruction set architecture of the processor.

15. The method of claim 8, wherein the first instruction is issued by a process running at a first privilege level, wherein the first privilege level is a user privilege level that is less privileged than a supervisor privilege level.

16. The method of claim 8, wherein the process is a code conversion process using the first instruction to load code for conversion instead of a second instruction for loading data.

17. The method of claim 8, further comprising determining whether the source location is within a range defined by one or more breakpoint registers.

18. The method of claim 14, further comprising indicating to self-modifying code detection logic that conversion of the content is to be tracked.

19. A system comprising:
a memory including a source location; and
a processor including
an instruction unit to receive a first instruction, wherein the first instruction is to have a source operand to indicate the source location and a destination operand to indicate a destination location; and
an execution unit to execute the first instruction, wherein execution of the first instruction includes checking the access permissions of the source location and loading content from the source location into the destination location, wherein execution of the first instruction succeeds in loading content from the source location into the destination register if the access permissions of the source location indicate that the content is executable and execution of the first instruction fails to load content from the source location into the destination register if the access permissions indicate that the content is not executable.

20. The system of claim 19, wherein the memory is also to store a data structure to be used by the processor to translate the source address operand to a physical in the system memory, wherein the data structure is to include the access permissions.

* * * * *